United States Patent [19]
Smith et al.

[11] Patent Number: 4,734,003
[45] Date of Patent: Mar. 29, 1988

[54] WOOD JOINT CONNECTOR PLATE

[76] Inventors: Glenn C. Smith; James R. Needham, both of 2914 E. Katella, Orange, Calif. 92667; William T. Turnbull, 1307 W. Sixth St., Suite 114, San Clemente, Calif. 91720

[21] Appl. No.: 944,192

[22] Filed: Dec. 22, 1986

[51] Int. Cl.4 ............................................. F16B 15/00
[52] U.S. Cl. .................................. 411/468; 403/405.1; 403/283
[58] Field of Search ....................... 403/283, 405, 189; 411/468, 467, 466, 461, 464; 52/DIG. 6

[56] References Cited

U.S. PATENT DOCUMENTS

| | | | |
|---|---|---|---|
| 3,633,454 | 1/1972 | Schmitt | 411/468 |
| 4,343,580 | 8/1982 | Moyer et al. | 411/468 |
| 4,418,509 | 12/1983 | Moyer et al. | 403/405 X |
| 4,639,176 | 1/1987 | Smith et al. | 411/468 |

FOREIGN PATENT DOCUMENTS

| | | | |
|---|---|---|---|
| 749595 | 1/1967 | Canada | 411/468 |
| 2501807 | 9/1982 | France | 411/468 |

*Primary Examiner*—Andrew V. Kundrat
*Attorney, Agent, or Firm*—Cullen, Sloman, Cantor, Grauer, Scott and Rutherford

[57] ABSTRACT

A wood joint connector plate is formed of a thin, rigid metal sheet having numerous narrow, elongated, struck-out openings. The struck-out sheet material is bent perpendicularly at each end of each opening to form a pair of opposing reverse-oriented mirror-image teeth. Each tooth is bent about a lengthwise bend line that is offset relative to the central longitudinal axis of its opening to divide the tooth into a narrow portion and a wide portion along its length. The free end of each tooth is formed as an asymmetrical V-shaped tip, whose apex coincides with the bend line, to provide a short leg terminating the tooth narrow portion and a long leg terminating the tooth wide portion. Each tooth is twisted around its bend line so that its tip short leg extends approximately parallel to the axis of the opening and towards its opposing tooth. The tip long leg extends away from its opposing tooth and its opening at an acute angle relative to the longitudinal axis of the opening. The wide portion of each tooth is divided into a tip outer part and a base part by a crease extending from the free end of the tip long leg to about the point where the base of the tooth is intersected by the longitudinal axis of the opening. The base part generally extends at an angle in the general direction of its opposing tooth, and the tip part is formed with a dished depression.

5 Claims, 7 Drawing Figures

WOOD JOINT CONNECTOR PLATE

BACKGROUND OF INVENTION

Wood joint connector plates are used for connecting wood members to form trusses, joists, beams and the like. These plates are made of thin, rigid sheet steel, such as galvanized steel, and are provided with struck-out teeth that embed into the adjacent wood members. Examples of connector plates are disclosed in U.S. Pat. Nos. 3,633,454, issued Jan. 11, 1972 to Schmitt et al., 3,951,033, issued Apr. 20, 1976 to Moehlenpah, 4,318,652, issued Mar. 9, 1982 to Gore, 4,343,580, issued Aug. 9, 1982 to Moyer et al. and related U.S. Pat. No. 4,639,176, issued Jan. 27, 1987 to Smith et al.

The connector plates are typically applied by first arranging the wood members, which are to be connected, in position to form a joint. A plate is placed over the joint location and then is pressed against the wood, using a suitable compression clamp or by hammering, so that its teeth embed into the wood. Ordinarily, a pair of plates are used, one on each side of the wood member joint.

The wood members which, for example, may be in the form of 2×4 strips, 2×6 strips, etc. may be positioned so as to form different shapes and styles of joints. For example, two wood strips may be arranged side-by-side and joined together to form a double-thick wood strip beam. As another example, abutting ends of aligned wood strips may be joined together to form a double length strip. As an example of a truss or a joist construction, the end of one wood strip may be cut at an angle which is abutted against a second wood strip. These strips may be joined together to form a V-shaped joint used in a truss or a joist.

Since wood and wood fibers are relatively flexible, after a period of time, there is a tendency for the teeth of a connector plate to loosen relative to the wood piece in which they are embedded. This loosening effect may be due to weather conditions, temperature changes, moisture, or load induced movement of the wood members, etc. For example, varying loads upon floor joists or roof trusses cause some movement of the wood elements and tends to loosen the connector plate teeth at the joints.

Further, connector plates are designed to support predetermined shear loads. Consequently, the number of plates, the size and thicknesses of plates, and the number of their teeth are ordinarily increased to handle anticipated high shear loads.

In the past, attempts have been made to design connector plate teeth which resist loosening from the wood into which they are embedded, and to increase their shear load strength. Thus, there has been a need for better connector plates whose teeth more tightly grip and intertwine with the wood fibers of the wood members in which they are embedded and which have a greater load carrying capacity. This invention relates to an improvement in connector plates for this purpose.

SUMMARY OF INVENTION

The invention herein contemplates an improved configuration for the struck-out teeth of a wood joint connector plate. A typical connector plate, used to form joints in trusses, beams, joists and the like, is made of thin, stiff sheet metal having opposed pairs of struck-out teeth. These teeth, which are reverse-oriented mirror images, result in elongated slots or openings extending between each adjacent pair of teeth.

The improved tooth configuration includes bending each of the teeth along a lengthwise bend line which is laterally offset relative to the central, longitudinal axis of its slot. This divides each tooth into a narrow portion and a wide portion. The free end of each tooth terminates in an asymmetrical V-shape tip whose short leg terminates the narrow portion and whose long leg terminates the wide portion of the tooth.

Further, each tooth is angularly twisted around its lengthwise bend line so that its tip short leg extends approximately parallel to the axis of the opening and towards its opposed tooth. However, the tip long leg is bent so that it extends away from its opposite tooth and at an acute angle relative to the longitudinal axis of the opening.

The wide portion of each tooth is further divided into a tip outer part and a base part by a cease which extends from the center of the base of the tooth (i.e. about where the tooth is intersected by the opening longitudinal axis) angularly to the free end of the wide leg of the tip. The tooth base part, which is adjacent the side edge of the tooth, is bent so that it extends, at a gradually increasing angle from the tip to the base towards its opposite tooth. Lastly, the tip part of the wide portion of the tooth is bent to form a dished-like depression. These various bends in a tooth, which may be about ⅛ inch long and about 1/10 inch wide, produce a strong, twisted interlock with the wood fibers into which the teeth are embedded. This interlock resists the tendency of the teeth to loosen over a period of time.

An object of this invention is to provide a tooth formation for a sheet metal wood joint connector plate which twists the wood fibers as the tooth is embedded in them so as to provide an interlock which resists loosening or withdrawal of the tooth from the wood. The configuration of each tooth, that is, the different bends and twists, can be formed in a single strike-out, punch operation using appropriately shaped punches which simultaneously punch a number of teeth in a single plate. Thus, without any increase in the cost of manufacturing the plate, the ability of the plate to grip the wood and withstand loosening is substantially increased. Meanwhile, the strength of the plate, particularly its ability to handle shear loads, is maximized.

A further object of this invention is to provide an improved wood joint connector plate which can be manufactured without increased cost, and which may be used in the usual manner of applying wood plates to form joints with wood strips, resulting in stronger, longer lasting joints.

These and other objects and advantages of this invention will become apparent upon reading the following description, of which the attached drawings form a part.

DETAILED DESCRIPTION

Figure 1:
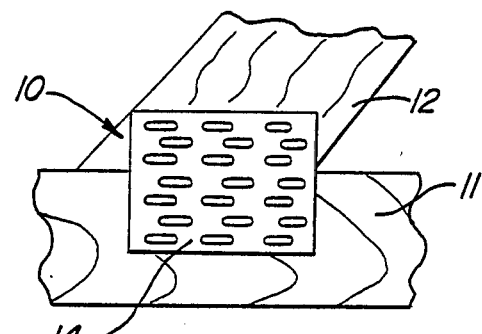
FIG. 1 is a fragmentary, elevational view of a typical joint formed between two wood members used in a truss construction.

FIG. 1 schematically illustrates a connector plate 10 forming a joint with a wood truss chord 11 and an angularly arranged wood truss member 12. This joint is illustrative of the use of the plate in connecting together adjacent portions of a pair of wood members which may form part of a truss or a joist.

Figure 2:
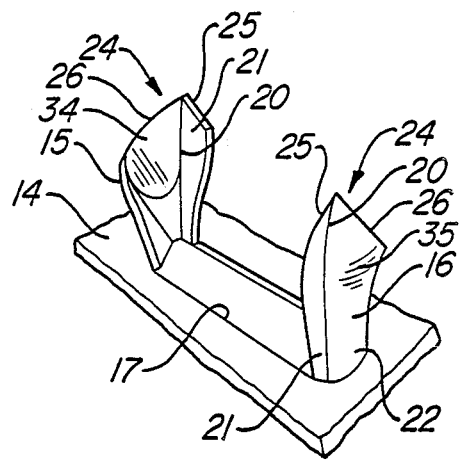
FIG. 2 is an enlarged, perspective view showing an opposing pair of teeth struck-out of the connector plate.
Figure 7:
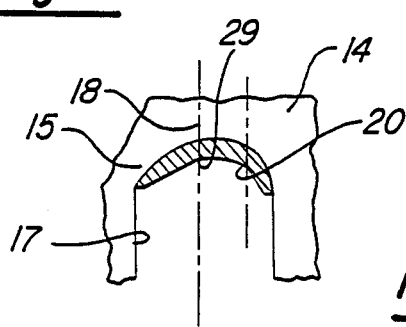
FIG. 7 is an enlarged, cross-sectional view of the base portion of a single tooth, taken in the direction of arrows 7—7 of FIG. 4.

The plate is formed of a flat metal sheet 14, such as galvanized steel, of a suitable thickness or gage. Pairs of opposing, reverse-oriented mirror-image teeth 15 and 16 (see FIG. 2) are struck out of the sheet 14. The struck-out teeth are bent perpendicularly to the plane of the sheet so that they are integral with the opposite ends of a narrow, elongated opening 17 resulting from the strike-out. These openings may be arranged in predetermined patterns upon the sheet, such as in offset rows, as schematically illustrated in FIG. 1. Each of these openings has a longitudinal axis 18. (See FIG. 7)

Each tooth is bent along a bend line 20 which extends substantially its full length. The bend line is offset relative to the longitudinal axis 18 of its opening (see FIG. 7) to divide each tooth into a narrow, lengthwise strip portion 21 and a wide, lengthwise strip portion 22.

The free end of each tooth is formed in the shape of an asymmetrical V-shaped tip 24. The narrow leg 25 of the tip terminates the narrow, lengthwise portion 21 of the tooth and the wide leg 26 of the tip terminates the wide lengthwise portion 22 of the tooth.

Figure 4:
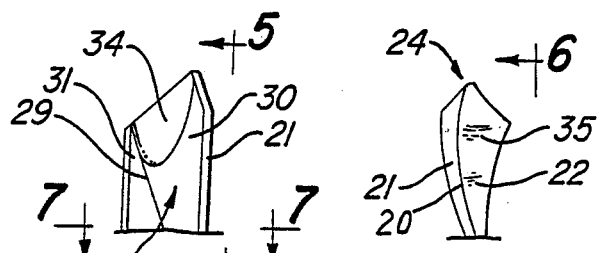
FIG. 4 is an elevational view of the inner face of a single tooth and is taken as if in the direction of arrows 4—4 of FIG. 3.
Figure 5:
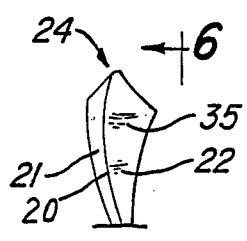
FIG. 5 is a side elevational view of one tooth, taken in the direction of arrows 5—5 of FIG. 4.

Each tooth is additionally provided with a bend or crease line 29 which extends angularly relative to the length of the tooth. That is, the crease line 29 extends approximately from the intersection between the base of the tooth and the longitudinal axis 18 of its opening towards the free end of the wide leg of the V-shaped tip (see FIG. 4). The crease further divides the tooth into a central tip part 30, which extends from the base of the tooth to its free end and includes the wide leg 26, and a side, generally triangularly-shaped base part 31.

Figure 6:
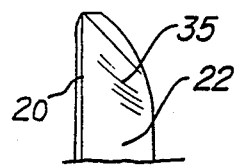
FIG. 6 is a rear elevational view of a tooth taken in the direction of arrows 6—6 of FIG. 5.

In addition, each tooth may be further provided with a dished depression 34 at the free end of its tip part 30. The formation of such a depression by the punch which strikes out the tooth from the sheet, also may form a slight bulge 35 on its opposite face (see FIG. 6).

Figure 3:
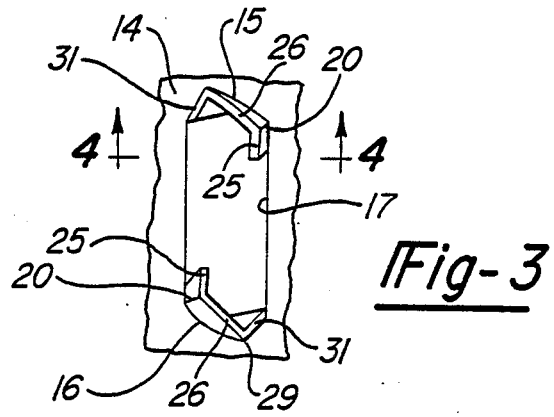
FIG. 3 is a top plan view of the pair of teeth of FIG. 2.

In addition to the bending of each tooth, the tooth is further twisted angularly around its bend line 20 to the point where the narrow leg 25 of the V-shaped tip 24 is approximately parallel to the centerline of the opening and extends towards the inner face of the opposing tooth in its pair. However, the wide leg 26 of the tip is bent outwardly, i.e. away from the opposing tooth in its pair at an acute angle relative to the opening axis (see FIG. 3). The base part 31 of the wide lengthwise portion 22 of the tooth, however, is bent angularly towards its opposing tooth.

The bent portions of each tooth, particularly where the depression is formed adjacent the outer, free edge of the tooth, causes the tooth to intertwine with and tightly interlock with the fibers of the wood when the teeth are driven into the wood. The intertwining and twisting of the wood fibers produces a strong, tight connection which resists loosening when the wood moves, expands or swells, etc. Moreover, the interconnection is relatively strong so as to better resist and to better support increased loads upon the composite member formed by the joined wood strips and connector plates, including increasing its shear strength.

This invention may be further developed within the scope of the following claims.

Thus, having fully described an operative embodiment of this invention, we now claim:

1. In a connector plate, for connecting abutting wood members, formed of a thin, rigid metal sheet with a substantial number of struck-out, narrow, elongated openings, each having a longitudinal axis, and with the material struck-out of each of the openings being bent perpendicularly to the sheet to form a pair of opposed, reverse-oriented mirror-image teeth, with the teeth each having a base integral with the sheet at the opposite, narrow ends of the openings and a free tip including an apex, and with each tooth of each pair having an inner face which faces towards its opposing tooth, and an outer face, the improvement comprising:

each tooth being bent along its length, about a bend line from the base to the apex of the free tip, that is transversely offset relative to the longitudinal axis of its opening to divide the tooth into a narrow and a wide strip portion along the length of the tooth;

the free tip of each tooth being formed in an asymmetrical V-shape, with a short leg terminating the narrow strip portion and a considerably longer leg terminating the wide strip portion, and the apex aligned with the bend line;

each tooth being twisted around the bend line, at a gradually increased degree of twist along the length of the tooth so that the tip short leg extends inwardly towards its opposing leg generally parallel to, but transversely offset from, the longitudinal axis of the opening, and the tip long leg extends in an outwardly direction away from the opposing tooth, at an acute angle relative to the longitudinal axis of the opening;

whereby when the plate is pressed against a face of a wood member for embedding the teeth into the wood member, each tooth intertwines with and tightly interlocks with the twisting fibers of the wood member to resist withdrawal therefrom.

2. In a connector plate as defined in claim 1, and with the inner face of each tooth being creased along a line that extends at an angle from approximately the place where the longitudinal axis of its opening intersects the tooth base to the end of the long leg of the V-shape tip to divide the wide portion of the tooth into a base part and a tip part.

3. In a connector plate as defined in claim 2, and with the tooth base part being bent, relative to the tooth tip part, so that said tooth base part generally extends at an acute angle relative to the axis of its opening, in a direction towards its opposing tooth.

4. In a connector plate as defined in claim 3, and with the inner face of the tooth wide portion tip part being additionally formed with a dished depression that opens towards its opposing tooth.

5. In a connector plate, for connecting abutting wood members, formed of a thin, rigid metal sheet with a substantial number of struck-out, narrow, elongated openings, each having a longitudinal aixs, and with the material struck-out of each of the openings being bent perpendicularly to the sheet to form a pair of opposed teeth, with the teeth each having a base integral with the sheet at the opposite, narrow ends of the openings and a free tip, and with each tooth of each pair having an inner face which faces towards its opposing tooth, and an outer face, the improvement comprising:

- each tooth being bent along its length, about a first bend line from the base to the free tip that is transversely offset relative to the longitudinal axis of its opening to divide the tooth into a narrow strip portion and a wide strip portion along the length of the tooth;
- the free tip of each tooth being formed in an asymmetrical V-shape, with a short leg terminating the narrow strip portion and a considerably longer leg terminating the wide strip portion, and whose apex is aligned with the first bend line;
- said wide strip portion being bent along its length about a second bend line from the base to the end of the longer leg of the V-shape tip at a gradually increasing angle from the tip to the base towards the opposite tooth to divde the wide portion of the tooth into a base part and a tip part adjacent the narrow strip portion; and
- each tooth being twisted around the first bend line, at a gradually increased degree of twist along the length of the tooth so that the tip short leg extends inwardly towards its opposing leg generally parallel to, but transversely offset from, the longitudinal axis of the opening, and the tip long leg extends in an outwardly direction away from the opposing tooth, at an acute angle relative to the longitudinal axis of the opening, and the base part extends at an acute angle relative to the axis of the opening in a direction towards the opposing tooth;
- whereby when the plate is pressed against a face of a wood member for embedding the teeth into the wood member, the teeth intertwine with and tightly interlock with the twisting fibers of the wood member to resist withdrawal from the wood member and to resist shear loads.

* * * * *